Dec. 24, 1968 J. F. GULICK, JR 3,418,596

AUTOMATIC FREQUENCY CONTROL SYSTEM

Filed June 6, 1967 2 Sheets-Sheet 1

INVENTOR
JOSEPH F. GULICK, Jr.

BY J. O. Tresansky
ATTORNEY

INVENTOR
JOSEPH F. GULICK, Jr.

United States Patent Office 3,418,596

Patented Dec. 24, 1968

3,418,596
AUTOMATIC FREQUENCY CONTROL SYSTEM

Joseph F. Gulick, Jr., Clarksville, Md., assignor to the United States of America as represented by the Secretary of the Navy Filed June 6, 1967, Ser. No. 644,464
9 Claims. (Cl. 331—33)

ABSTRACT OF THE DISCLOSURE

The present invention pertains to an AFC system comprising a mixer, a local oscillator, an intermediate frequency amplifier and a discriminator, said system having a stable automatic frequency control loop when the oscillator is tuned both below and above the frequency of an incoming signal.

The particularly disclosed discriminator includes three tuned LC circuits resonant below, at and above, respectively, the desired center frequency of the discriminator, wherein each of the three LC circuits is associated with one of three appropriately oriented diodes. The input to the discriminator is either a transformer whose primary winding receives a signal from the IF amplifier and whose secondary winding feeds said signal to the three LC circuits simultaneously; or three transformers having three secondary windings and a single primary winding common to each of said secondary windings, wherein the input signal to said primary winding is from the collector of a transistor whose base receives said signal from the IF amplifier. The output from the discriminator is used as a control signal in an AFC loop.

The present invention further pertains to a circuit which can be employed as a fast rise-time narrow-band filter and simultaneously as a discriminator in an AFC system. Such a circuit has two outputs, the first for extracting signals which are utilized in an AFC loop, and the second for extracting signals which are utilized in a circuit for indicating the presence of an incoming signal.

*Background of the invention*

*Field of the invention.*—The present invention relates to an AFC system for a receiver, which is capable of locking the local oscillator frequency at a particular value so that an incoming signal, after heterodyning, is at the center frequency of the IF amplifier, irrespective of whether the local oscillator is tuned below or above the frequency of said incoming signal. The locking mechanism of the subject AFC system is a discriminator having a plurality of tuned circuits and having an output response which is proportional to the frequency deviation of an incoming signal.

*Description of the prior art.*—In numerous applications, searching for an incoming signal of an unknown frequency is necessary; and customarily, a heterodyne receiver with means for sweeping the local oscillator across a wide frequency range is employed. When the difference between the local oscillator frequency and the frequency of the incoming signal is equal to the center frequency of the IF amplifier, the sweeping of the local oscillator should be halted and means should be provided for maintaining the local oscillator at such a position. The means employed for stopping the local oscillator sweep and for maintaining the local oscillator position, is customarily an AFC circuit.

It should be stressed that two values of local oscillator frequency will yield a heterodyned incoming signal of the proper frequency, the first value being when the local oscillator frequency subtracts from the incoming signal frequency to yield the center frequency of the IF amplifier, and the second value being when the incoming signal frequency subtracts from the local oscillator frequency to yield the center frequency of the IF amplifier. (Hereinafter, the "difference frequency" will be used to encompass both of the above-noted conditions.) It is therefore obvious that an AFC circuit, for its most efficient operation, should have the capability of being able to lock the local oscillator at two separate frequencies, one below and one above the frequency of an incoming signal. In the past, though, AFC circuits have had capabilities of properly controlling the local oscillator when said local oscillator is tuned either below *or* above, but not below *and* above, the frequency of an incoming signal.

Such an AFC circuit, as known in the prior art, is shown in Patent No. 2,286,378, issued to Roberts in June 1942. In the Roberts AFC circuit, a discriminator comprising two tuned circuits and two appropriately oriented diodes are shown. As noted above, the Roberts discriminator is capable of transmitting proper control signals to the local oscillator when the local oscillator is tuned either below or above the frequency of an incoming signal. That the Roberts discriminator does not yield a stable frequency control signal when the local oscillator is tuned both below and above the frequency of the incoming signal is evident when one notes that the discriminator output response, as a function of local oscillator frequency, is nonrepeating about the frequency of the incoming signal. In other words, the sense of the discriminator output response is reversed, depending upon which side of the incoming signal frequency the local oscillator is tuned.

*Summary of the invention*

The AFC system of the present invention utilizes a discriminator which relieves an important limitation found in the discriminator of the prior art, namely, the limitation of being operable when the local oscillator is tuned to only one side of the signal frequency. In the subject invention, the AFC system operates with stability when the local oscillator is swept either below or above the signal frequency, this stability resulting from the employment of a discriminator whose output response, as a function of local oscillator frequency, repeats about the frequency of the incoming signal. The input circuitry for use with the subject discriminator is designed so that it maintains the efficiency of the AFC system at a high level.

The subject invention further relates to a circuit having the capabilities of functioning as a fast rise-time narrow-band filter and simultaneously as a discriminator for an AFC system. For performing these dual functions, the circuit is provided with two outputs, one for feeding a control signal to the local oscillator through a conventional AFC amplifier, and the other for feeding a signal to a display device through a blocking oscillator.

It is therefore an object of the invention to provide a highly stable AFC system.

It is another object of the invention to provide an AFC system which is stable in operation when the local oscillator of the system is tuned either below or above the frequency of an incoming signal.

It is a further object of the invention to provide a discriminator which is capable of stable operation in an AFC circuit when the local oscillator of the circuit is tuned either below or above the frequency of an incoming signal.

It is still another object of the invention to provide an AFC system having a discriminator comprising a plurality of tuned circuits, whose output response, as a function of local oscillator frequency, repeats about the frequency of an incoming signal.

It is still a further object of the invention to provide input circuitry for a discriminator which comprises a plurality of tuned circuits, wherein substantially total isolation exists between said tuned circuits.

It is yet another object of the invention to provide a circuit whose output is segregated into multiple parts and is simultaneously used in an AFC system and in a system for indicating the presence of an incoming signal.

It is yet a further object of the invention to provide a circuit which functions as a fast rise-time narrow-band filter and simultaneously as a discriminator.

These and other objects of the invention will be more fully understood when reference is made to the description of the preferred embodiments in conjunction with the drawings.

*Description of the preferred embodiments*

Figure 1:
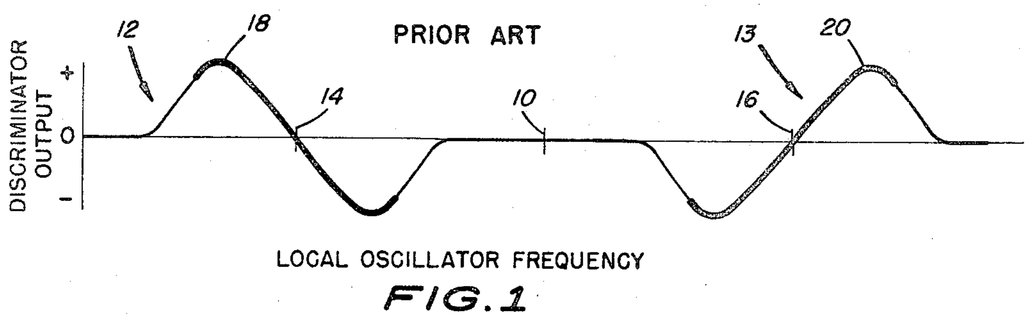
FIG. 1 is a curve showing the output response of a conventional discriminator plotted against local oscillator frequency.

With particular reference to FIG. 1, there is shown the output response versus local oscillator frequency of a conventional discriminator, such as that shown in the Roberts patent, noted above. The frequency of a typical incoming signal is shown at 10, and the output curves of the conventional discriminator are shown generally at 12 and 13. The local oscillator frequencies which yield a difference frequency equal to the center frequency of the IF amplifier, are shown at 14 and 16, respectively.

Since local oscillator frequencies 14 and 16 represent ideal conditions, namely, conditions wherein no correction of the local oscillator is necessary, it is desirable that no correcting output should flow from the discriminator at such frequencies. For this reason, the conventional discriminator is designed so that its output curve, as a function of local oscillator frequency, crosses the zero axis at frequencies 14 and 16, as shown in FIG. 1.

In operation, the output of the conventional discriminator, which is dependent upon frequency, is fed to the local oscillator of the system through a conventional AFC amplifier. The local oscillator is designed to increase in frequency in response to a discriminator signal of a first polarity and to decrease in frequency in response to a discriminator signal of a second and opposite polarity.

Since local oscillator frequency reduction is necessary when said local oscillator is tuned to frequencies slightly higher than those represented by 14 and 16; and since the polarity of the discriminator output is reversed at frequencies slightly higher than those represented by 14 and 16, it is obvious that the conventional discriminator is useful when the local oscillator is tuned below *or* above, but not below *and* above, the frequency of the incoming signal. Reiterating, the discriminator of the prior art is useful over only one of its two output curves, namely, either the curve represented by heavy line 18 or the curve represented by heavy line 20, but not over both of said curves.

Figure 2:
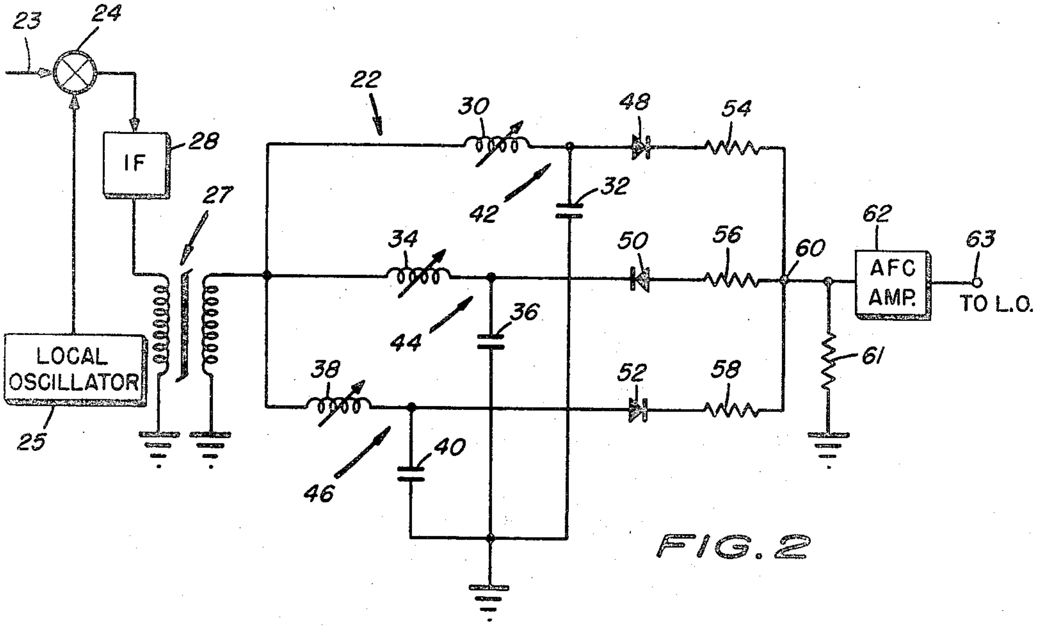
FIG. 2 is a circuit schematic showing one embodiment of the present invention.

Referring now to FIG. 2, there is shown a first embodiment of the discriminator of the present invention which overcomes the above-noted limitation found in the prior art. The discriminator is shown generally at 22 and receives an incoming signal 23 after said signal combines, in mixer 24, with a signal from local oscillator 25. The combined signal emergent from mixer 24 is then fed to the primary winding of transformer 27 after it is amplified by IF amplifier 28.

The discriminator 22 consists of a first tuned circuit comprising inductor 30 and capacitor 32, a second tuned circuit comprising inductor 34 and capacitor 36 and a third tuned circuit comprising inductor 38 and capacitor 40. The first, second and third tuned circuits are shown generally at 42, 44 and 46, respectively, and are designed to resonate below, at and above, respectively, a predetermined discriminator center frequency. The predetermined center frequency of the subject discriminator is chosen to be the center frequency of the IF amplifier.

Associated with tuned circuits 42, 44 and 46 are diodes 48, 50 and 52, respectively. Diodes 48 and 52 are oriented in such a manner that they conduct what shall be called a positive signal to their associated resistors 54 and 58, respectively; and diode 50 is oriented in such a manner that it conducts what shall be called a negative signal to its associated resistor 56. After the positive and negative signals pass through resistors 54, 56 and 58, said signals, initially emergent from tuned circuits 42, 44 and 46, are caused to merge at junction 60. The signal reaching junction 60 causes a voltage to appear across load resistor 61. Said voltage is then amplified by a conventional AFC amplifier 62 and is directed, via terminal 63, to local oscillator 25 for controlling the frequency of said local oscillator. (It should be understood that an AFC amplifier appears between the discriminator output and the local oscillator in all embodiments, though not shown.)

Figure 3:
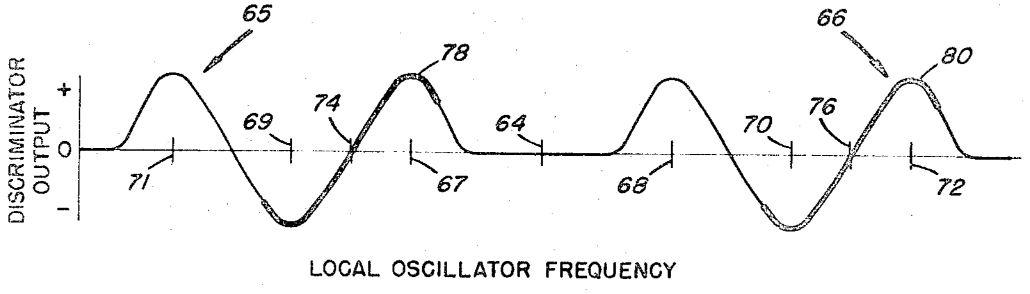
FIG. 3 is a graph showing the output response of the subject discriminator plotted against local oscillator frequency.

Referring now to FIG. 3, there is shown the output response versus local oscillator frequency for the discriminator shown in FIG. 2. The frequency of a typical incoming signal is shown at 64 and the discriminator output curves are shown generally at 65 and 66. When the local oscillator is tuned to a frequency represented by either 67 or 68, tuned circuit 42 is resonant; when the local oscillator is tuned to a frequency represented by either 69 or 70, tuned circuit 44 is resonant; and when the local oscillator is tuned to a frequency represented by either 71 or 72, tuned circuit 46 is resonant. That the tuned circuits are resonant at two local oscillator frequencies is, as discussed above, due to the two images of the heterodyned signals.

The values of the discriminator components are chosen so that the discriminator output is zero when the difference frequency equals the center frequency of the IF amplifier. The local oscillator frequencies at which the above conditions are met are shown at 74 and 76.

As noted above, with reference to FIG. 1 ideal conditions exist when the local oscillator is tuned to frequencies represented by 14 and 16. Similarly, with reference to FIG. 3, ideal conditions exist when the local oscillator is tuned to frequencies represented by 74 and 76. As also noted above, with reference to FIG. 1, when the local oscillator is tuned to a frequency slightly above the ideal frequency 14, the discriminator output is of an opposite polarity than when the local oscillator is tuned to a frequency slightly above ideal frequency 16, making only one of the discriminator curves, 12 or 13, useful. The subject invention removes this limitation.

Referring again to FIG. 3, since the output response is of a like polarity when the local oscillator is tuned slightly above both ideal frequency 74 and ideal frequency 76, the discriminator is useful over a portion of both of its curves, 65 and 66. In particular the portions of the curves 65 and 66 which are useful in AFC systems are shown by heavy lines 78 and 80, respectively and can be termed correction curves. Since the subject discriminator has an output response which repeats as the local oscillator is caused to sweep through the signal frequency, it is evident that the subject discriminator forms a stable AFC loop whether the local oscillator is tuned above or below the frequency of an incoming signal.

Figure 4:
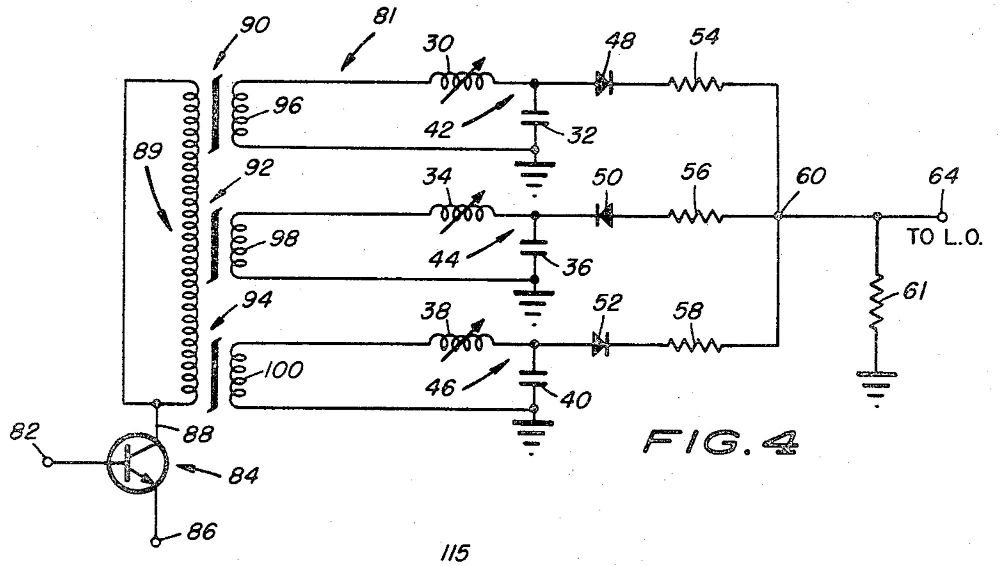
FIG. 4 is a schematic showing a second embodiment of the present invention.

Referring now to FIG. 4 there is shown a second embodiment of the subject discriminator. Due to the similarities between the discriminator of FIG. 2 and the discriminator of FIG. 4, corresponding elements are similarly referenced and will not be further discussed.

The discriminator, shown generally at 81, receives a signal from the IF amplifier at the base 82 of transistor 84. The emitter 86 of the transistor 84 is biased by an appropriate voltage source (not shown) and the collector 88 feeds the signal received at base 82 to the discriminator input circuitry which is of the transformer variety. The input circuitry is composed of a single primary winding 89 common to three input transformers shown generally at 90, 92 and 94. The input transformers 90, 92 and 94 have secondary windings 96, 98 and 100, respectively, said secondary windings being associated with, and providing inputs for, tuned circuits 42, 44 and 46, respectively.

In operation, the discriminator shown in FIG. 4 functions substantially as does the discriminator shown in FIG. 2, but has a slightly higher efficiency. This increase in efficiency is caused by better isolation between inductors 30, 34 and 38. In the discriminator of FIG. 2, the inductors 30, 34 and 38 are fed at a commond junction, and therefore are able to interact with one another. But in the discriminator shown in FIG. 4, inductors 30, 34 and 38 receive their signals from three separate transformers 90, 92 and 94, respectively, and are therefore less able to interact. To decrease interaction still further, the common primary winding 89 is fed from an extremely high impedance source, namely, collector 88 of transistor 84. By feeding primary winding 89 from such a high impedance source, interaction between secondary windings 96, 98 and 100 is greatly reduced.

Figure 5:
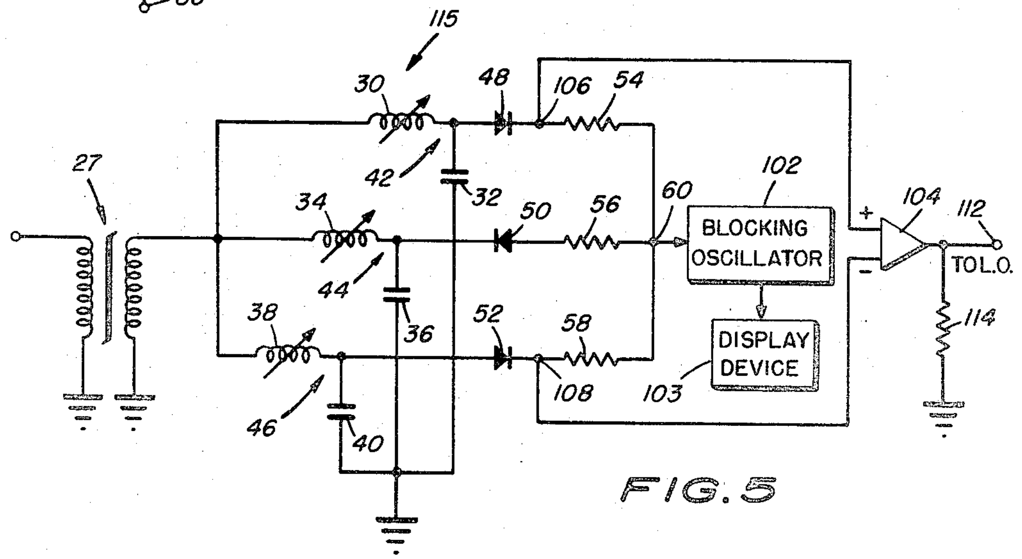
FIG. 5 is a circuit schematic showing a third embodiment of the present invention.

With reference now to FIG. 5, there is shown a third embodiment of the subject invention. Due to the similarities between the circuit of FIG. 5 and that shown in FIG. 2, corresponding elements are similarly referenced and will not be further discussed.

It is often desirable to provide a circuit which can perform both discrimination functions and signal indication functions. In radar systems, when the local oscillator is caused to sweep in frequency while searcing for a signal of an unknown frequency, a discriminator which can lock the local oscillator at a proper frequency is necessary; and a circuit which indicates the presence or absence of an incoming signal is also necessary. The circuitry shown in FIG. 5 is made to accomplish these dual functions.

In the circuit shown in FIG. 5, two separate outputs are provided, each output serving to provide a signal useful in the performance of one of the two desired functions of the circuit. The first output is taken at junction 60 which, like the correspondingly numbered junction shown in FIG. 2, combines signals which were initially emergent from tuned circuits 42, 44 and 46. The signal emergent from junction 60 is fed to a blocking oscillator 102 which in turn feeds a triggering signal to display device 103 for indicating the presence of an incoming signal.

The second output is taken at difference amplifier 104 and is used in an AFC circuit for providing a control signal to the local oscillator. The signal emergent from difference amplifier 104 is the difference between two individual signals extracted from diodes 48 and 52, at 106 and 108, respectively. Said signal emergent from amplifier 104 is fed to the local oscillator through and AFC amplifier (not shown) via terminal 112 after said signal causes a voltage to appear across load resistor 114.

The operation of the circuit shown in FIG. 5 can be best understood when explained with reference to the curves shown in FIG. 6. The signal reaching blocking oscillator 102, after being extracted from junction 60, is shown by curve 116; and the signal reaching the local oscillator, after being extracted from terminal 112 and passing through and AFC amplifier, is shown by curve 118.

Since a blocking oscillator is a device which transmits a response only when it is triggered by an incoming signal which has both a particular polarity and a minimum amplitude, and since the incoming signals employed in radar systems are pulses of extremely short duration, it is necessary that the circuitry which feeds incoming signals to the blocking oscillator has a rise-time fast enough to respond to such incoming signals. It is a further requirement of said circuitry, that it be capable of issuing a response of the appropriate polarity only when an incoming signal is detected, i.e., only when the signal, after heterodyning, is in a range centered about the center frequency of the IF amplifier employed in the system. The circuit shown in FIG. 5 which feeds the incoming signals to the blocking oscillator 102, namely the circuit shown generally at 115, has both of the above-noted requirements.

Figure 6:
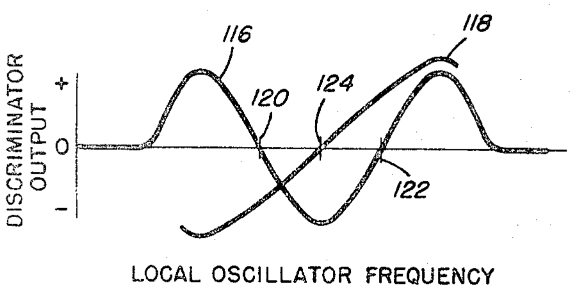
FIG. 6 is a curve showing the output response plotted against local oscillator frequency for the circuit shown in FIG. 5.

Since curve 116 of FIG. 6 represents the output of a circuit comprising three tuned LC circuits interacting with one another, it is obvious that the circuit can be made to have a rise-time which is much more rapid than that of a conventional filter having a comparable band-width. This improvement is due to the fact that the response shown between frequencies 120 and 122 is due, not merely to the functioning of tuned circuit 44, but to the functioning of tuned circuit 44 interacting with tuned circuits 42 and 46. It is therefore apparent that tuned circuit 44 has a band-width greater than that represented by the frequency range between frequencies 120 and 122; and, therefore, the rise-time associated with the response between frequencies 120 and 122 is faster than that associated with tuned circuit 44 alone.

The blocking oscillator 102 is designed to respond only to signals of a negative polarity, and therefore is activated only when the local oscillator is tuned to frequencies bounded by frequencies 120 and 122. That the blocking oscillator will issue a signal which triggers display device 103 only when the heterodyned incoming signal is of a frequency near the center frequency of the IF amplifier, is obvious when one notes that the frequency represented by 124 is an ideal frequency. Specifically, 124 is the local oscillator frequency which combines with the signal frequency to yield a response having the IF amplifier center frequency. It is therefore evident that the discriminator curve should cross the axis of FIG. 6 at ideal frequency 124; and discriminator curve 118 does, in fact, cross the axis at this local oscillator frequency.

Therefore, the circuit shown in FIG. 5 accomplishes two functions. First, it acts as a discriminator in an AFC system; and, second, it acts as a fast rise-time narrow-band filter which passes only a narrow band of signals to circuitry for indicating the presence of an incoming signal.

It will be understood that the discriminator shown herein can be used with either input arrangement and either output arrangement as well as with other changes and modifications, without departing from the spirit or scope of the invention. The disclosure herein is given for the purpose of illustration only and it is desired that the protection afforded hereby be not limited thereto, but only to the extent set forth in the appended claims.

I claim:

1. In an AFC system comprising a mixer, a local oscillator, an IF amplifier centered at a first frequency and a discriminator centered at a second frequency, wherein said mixer is capable of combining an incoming signal of a third frequency with a signal from said local oscillator and transmitting the combined signal to said IF amplifier, and wherein said discriminator is capable of sampling said combined signal and transmitting a command signal to said local oscillator if said combined signal is of a frequency different from said first frequency, the improvement comprising:

a discriminator whose output response, as a function of local oscillator frequency, is such that at the two distinct local oscillator frequencies which mix with said incoming signal of said third frequency to form a combined signal of said first frequency, there are centered two distinct but identically shaped correction curves, the result being that said AFC system is stable in operation when said local oscillator is tuned both below and above said third frequency.

2. The AFC system of claim 1 wherein said discriminator comprises:

a first tuned circuit resonant below said second frequency;

a second tuned circuit resonant at said second frequency;

a third tuned circuit resonant above said second frequency; and first, second and third diodes associated with said first, second and third tuned circuits, respectively, said first and third diodes being oriented so as to conduct in a first direction, and said second diode being oriented so as to conduct in a second and opposite direction.

3. The AFC system of claim 2, wherein said discriminator further comprises:

output means including a common junction for signals initially emergent from said first, second and third tuned circuits.

4. The AFC system of claim 3, wherein signals emergent from said output means comprise said command signal for controlling said local oscillator.

5. The AFC system of claim 3, wherein said discriminator further comprises:

further output means including a common junction for signals initially emergent from said first and third tuned circuits, and wherein:

signals emergent from said output means are used to indicate the presence of said incoming signal, and signals emergent from said further output means comprise said command signal for controlling said local oscillator.

6. The AFC system of claim 2 further comprising:

first, second and third input transformers having first, second and third secondary windings, respectively, and a single primary winding common to said first, second and third secondary windings, said first, second and third secondary windings forming individual inputs to said first, second and third tuned circuits, respectively.

7. The AFC system of claim 6, further comprising:

transistor means for receiving said incoming signal at its base and transmitting said incoming signal to said primary winding via its collector.

8. In an AFC system comprising a mixer, a local oscillator, an IF amplifier and a discriminator having a predetermined center frequency, the improvement being a discriminator whose output response, as a function of local oscillator frequency, is such that at the two distinct local oscillator frequencies which mix with an incoming signal to form a combined signal at the center frequency of said IF amplifier, there are centered two distinct but identically shaped correction curves, and comprising:

a first tuned circuit resonant below said center frequency;

a second tuned circuit resonant at said center frequency;

a third tuned circuit resonant above said center frequency;

first, second and third diodes associated with said first, second and third tuned circuits, respectively, said first and third diodes oriented so as to conduct in a first direction, and said second diode oriented so as to conduct in a second and opposite direction;

output means including a common junction wherein signals initially emergent from said first, second and third tuned circuits are caused to merge; and transmission means for feeding a signal emergent from said output means to said local oscillator for controlling the frequency of said local oscillator, said signal emergent from said output means being of such a nature that, when transmitted to said local oscillator, the AFC system is stable over a large range of local oscillator frequencies.

9. In an AFC-display system comprising a mixer, a local oscillator, an IF amplifier, a discriminator having a predetermined center frequency, and a display device, a discriminator comprising:

a first tuned circuit resonant below said center frequency;

a second tuned circuit resonant at said center frequency;

a third tuned circuit resonant above said center frequency;

first, second and third diodes associated with said first, second and third tuned circuits, respectively, said first and third diodes oriented so as to conduct in a first direction, and said second diode oriented so as to conduct in a second and opposite direction;

first, second and third input transformers having first, second and third secondary windings, respectively, and a single primary winding common to said first, second and third secondary windings, said first, second and third secondary windings forming individual inputs to said first, second and third tuned circuits, respectively;

transistor means for receiving said incoming signal at its base and transmitting said incoming signal to said primary winding via its collector;

first output means including a common junction where signals initially emergent from said first, second and third tuned circuits are caused to merge therein, and wherein:

signals emergent from said first output means are used to trigger a display device for indicating the presence of said incoming signal; and second output means including a difference amplifier wherein signals initially emergent from said first and third tuned circuits are caused to merge therein, and wherein:

signals emergent from said second output means comprise said command signal for controlling said local oscillator.

References Cited

UNITED STATES PATENTS

| | | | |
|---|---|---|---|
| 2,771,552 | 11/1956 | Lynch | 329—142 |
| 2,354,827 | 8/1944 | Peterson | 329—142 |
| 2,946,884 | 7/1960 | Mraz | 325—423 |

JOHN KOMINSKI, *Primary Examiner.*

U.S. Cl. X.R.

325—433; 329—141, 142; 331—8